United States Patent [19]
Mansfield

[11] 3,839,318
[45] Oct. 1, 1974

[54] PROCESS FOR PREPARATION OF ALKYL GLUCOSIDES AND ALKYL OLIGOSACCHARIDES

[75] Inventor: Richard C. Mansfield, Dresher, Pa.

[73] Assignee: Rohm and Haas Company, Philadelphia, Pa.

[22] Filed: Sept. 27, 1970

[21] Appl. No.: 67,549

[52] U.S. Cl. .................................. 260/210 R
[51] Int. Cl. .................................. C07c 47/18
[58] Field of Search .......................... 260/210 R

[56] References Cited
UNITED STATES PATENTS
3,547,828  12/1970  Mansfield et al. ............. 260/210 R
3,598,865   8/1971  Lew ............................... 260/210 R

*Primary Examiner*—Johnnie R. Brown
*Attorney, Agent, or Firm*—H. Jolyon Lammers

[57] ABSTRACT

A process for the preparation of higher alkyl monosaccharides and oligosaccharides which are surface active. It involves the direct glucosidation of higher alkanols, omitting the double alcohol interchange by careful adjustment of the reaction conditions primarily by limiting the rate of formation of the water of reaction and the rate of oligomerization.

6 Claims, 1 Drawing Figure

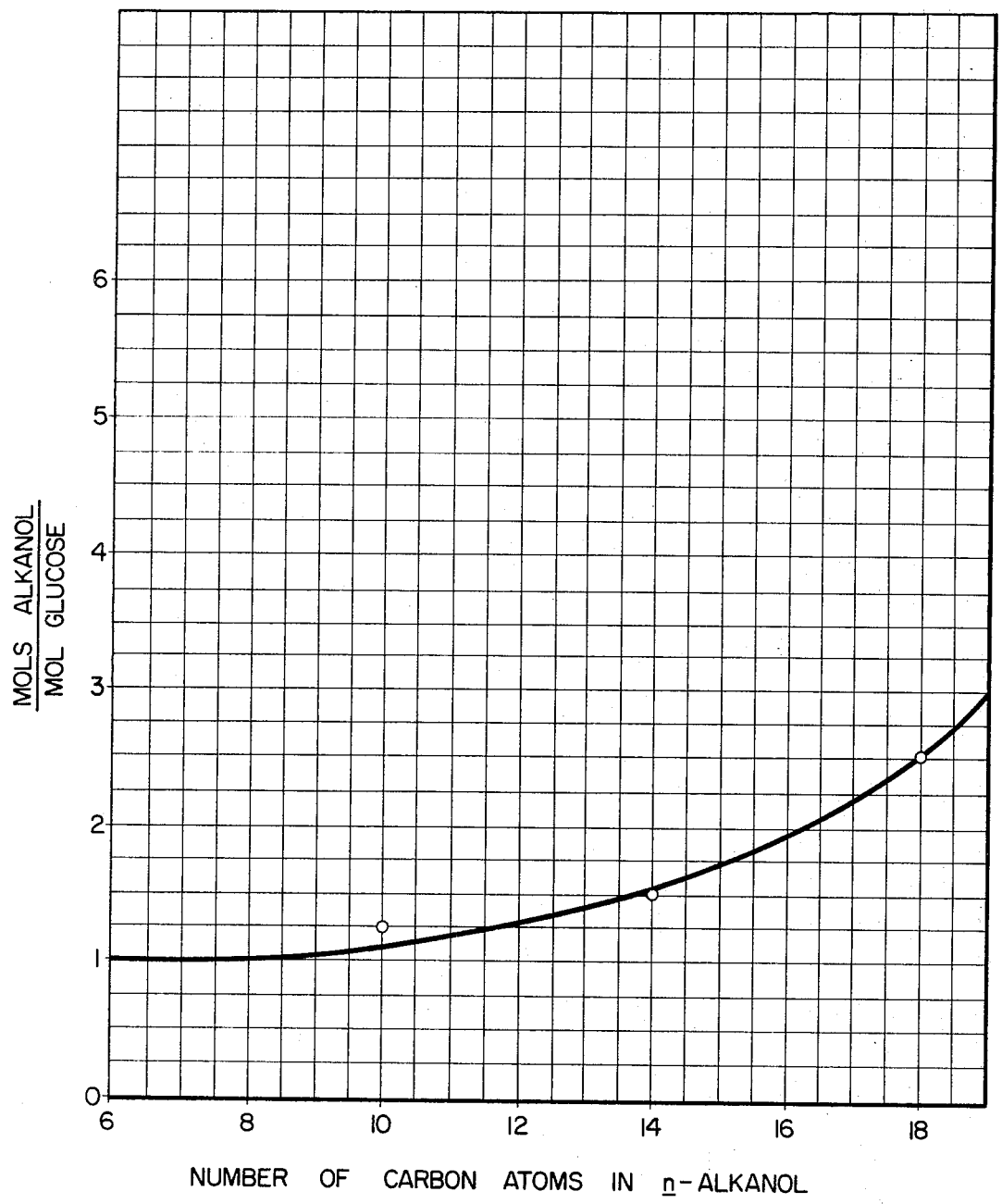

PROCESS FOR PREPARATION OF ALKYL GLUCOSIDES AND ALKYL OLIGOSACCHARIDES

This invention concerns mixtures of glycosides comprised of higher alkyl monosaccharides and higher alkyl oliogosaccharides, and processes for the preparation thereof. In particular, it is concerned with mixtures of such glycosides in which their alkyl moiety has high molecular weight and the mixture is surface-active.

The higher molecular weight alkyl monosaccharides and alkyl oligosaccharides are nonionic detergents which show high stable foams and which act as foam stabilizers for other surfactants. They are good emulsifiers and wetting agents. They are also biodegradable when tested in raw river water.

The prior art teaches that when the alkyl moiety is greater than about $C_4$, then alkyl glucosides are only difficultly preparable by reacting the alcohol directly with glucose in the presence of an acid catalyst.

Although direct glycosidation has been alleged to be suitable for the preparation of alkyl glucosides with aglycon groups as large as octyl (see U.S. Pat. No. 3,450,690) no enabling disclosure or working examples were given by these workers. The art has thus not suggested, heretofore, that direct glycosidation is practical for the preparation of alkyl glucosides based on alkanols of $C_6$, and higher, up to $C_{18}$. Furthermore, the art has not even suggested that direct glycosidation can be used for the preparation of mixtures of alkyl monosaccharides and alkyl oligosaccharides from the higher alcohols described above.

Boettner (U.S. Pat. No. 3,219,656) teaches the preparation of higher alkyl glucosides by a double alcohol interchange, lastly employing a high molecular weight alcohol in the presence of a macroreticular-structured sulfonic acid type cation exchange resin which is anhydrous and in the acid form.

The desirability of reacting a higher alcohol directly with glucose to obtain the desired surface-active higher alkyl glycosides is not novel; it has generally been believed that the reaction is suitable only for the preparation of glucosides of lower alcohols. The reasons for this belief are related to the fact that glucose is less soluble in higher alcohols than in ones of lower carbon chain length.

It is, therefore, an object of this invention to provide a process for the direct preparation of higher alkyl glucoside-higher alkyl oligosaccharide mixtures from glucose and higher alochols.

I have found that by careful control of the reaction conditions, I can successfully prepare a large variety of these mixtures directly from monosaccharides and higher alcohols. I accomplish this objective firstly by careful adjustment of the reaction conditions, so that the rate of formation of the water of reaction is relatively slower than the rate in which the system can remove same from the reaction mixture. Secondly, oligomerization, degradation and charring of glucose are avoided. Thirdly, the rate of oligomerization of the alkyl glycosides and further undesirable polymerization of the alkyl oligosaccharides are kept very slow.

The discovery and recognition of the criticality of these conditions provides the desired mixtures in a more economical fashion by obviating the intermediate alcohol interchange reaction and also the need to separately remove the lower alkanol which previously was needed.

Among the several advantages of the presently disclosed novel process are: omission of use of an intermediate lower molecular weight alcohol; obviating the need for a latent solvent (Ser. No. 703,539, Feb. 7, 1968 U.S. Pat. No. 3,598,865, issued Aug. 10, 1971 to Atlas); precluding the need of intermediate distillation of the lower alcohol; and relatively lower volume requirements.

The molar ratio of higher alcohol to glucose can be from 6.0 to 1.0 down to 1.0 to 1.0, but it is preferable from 4.0 to 1.0 down to 1.25 to 1.0. If less than one mol of alcohol/mol of glucose is employed, the reaction mixture may thicken. It may then become difficult, if not impossible, for all of the monosaccharides to react before appreciable oligomerization occurs and the mixture becomes unstirrable. At the other extreme, when employing molar ratios above 6, the volume requirements become excessive so that considerable reaction vessel productivity is lost.

I have found that it is necessary to use a higher mol ratio as the molecular weight of the alcohol is increased, because the sugar becomes less soluble in the less polar alcohols. While the distinction between an acceptable and nonacceptable mol ratio is not a sharp one, there is necessarily a gradual increase in the requirement for more alcohol as its molecular weight increases.

Broadly stated, it is necessary to increase the molar ratio of the alcohol to the sugar as the molecular weight of the alcohol increases. Thereby, a suitable allowance is made for the decreasing glucose solubility to permit the desired degree of reaction. For example, the FIGURE shows the approximate mol ratios at which this process is operable with a series of normal primary alcohols in the range of six to 18 carbon atoms. It should be remembered, however, that the demarcation between acceptable and non-acceptable mol ratios has some degree of latitude. It is probable that some mol ratios varying as much as about 0.1 mol below the curve of the FIGURE may be operable under optimum operating conditions.

Typical of the higher molecular weight alcohols which can be employed in the present invention are n-dodecyl alcohol, n-tetradecyl alcohol, n-octadecyl alcohol, undecyl alcohol, tridecyl alcohol, n-hexadecyl alcohol, n-hexyl alcohol, n-decyl alcohol and n-octanol.

In fact, any alcohol containing a primary alcohol group which falls in the molecular weight range of about 102 to about 270 is suitable.

Also of interest are the glucosides prepared from iso-decyl, iso-undecyl, iso-tridecyl alcohols, said branched chain primary alcohols being prepared by the oxo process, which process is well-known and the products thereof are commercially available.

Other sources of glucose can be employed, such as maltose, sucrose, disaccharides, and polysaccharides, containing the glucose moiety. These other sources must be hydrolyzable to glucose. Thus, syrups such as corn syrups, which contain glucose and maltose, prepared from the hydrolysis of starch, can be used. However, glucose is readily commercially available, and represents the preferred starting material.

Aldose sugars from which glycosides may be prepared for the preparation of the improved compositions include: apiose, arabinose, galactose, glucose, gulose, lyxose, mannose rhamnose, ribose, talose, xylose, and the like. Of the glycosides of the aldose sugars most commonly known are those derived from glucose which are generally termed glucosides.

The higher alkyl-glucosides which are major components of the compositions produced by the claimed process are nonionic surface-active materials which very effectively lower the surface tension of aqueous solutions. The following table illustrates this fact:

TABLE 1

| Alkyl glucoside | V in dynes/cm. | | | |
|---|---|---|---|---|
| | .001 | 01 | 0.1 | 1.0 |
| n-Octyl | 53 | 37 | 29 | 21 |
| n-Decyl | 58 | 36 | 27 | 26 |
| n-Dodecyl | 36 | 24 | 22.5 | 22.5 |
| Iso-decyl | ——26 | — | | |
| Iso-undecyl | ——26 | — | | |
| Iso-tridecyl | ——24 | — | | |
| "Triton X-100" | 50 | 28.5 | 29.5 | 30.5 |

Triton X-100 is a commercially available non-ionic surface-active material of the octylphenoxy-polyethoxyethanol type. The value of 22.5 dynes/cm. for the n-dodecyl glucoside at a concentration of 0.1 percent is about the theoretical limit for a hydrocarbon surfactant. This illustrates the very effective surface tension lowering of these materials.

The higher alkyl-glucosides are also effective at lowering the interfacial tension between water and oil. This fact is illustrated in the following table:

TABLE 2

| Percent surfactant in aqueous phase | Interfacial tension v. Atreol 9 in dynes/cm. | |
|---|---|---|
| | 0.1% | .01% |
| Alkyl glucoside | | |
| n-Octyl | 7.9 | 25.3 |
| n-Decyl | 1.7 | 16.8 |
| n-Dodecyl | 1.7 | 3.1 |
| "Triton X-100" | 2.5 | 10.0 |

There are two general procedures which are suitable for the aspect of this invention involving the water removal.

The first, and preferred, procedure involves the removal of the water of reaction by vacuum distillation. Thus, a mixture of alcohol, catalyst, and glucose is heated to reaction temperature at reduced pressure, and water of reaction is distilled from the mixture as it is formed. When the reaction is complete, the mixture is neutralized and the product, if desired, is further purified by removal of some or all of the unreacted alcohol. In this procedure, it is desirable to maintain the pressure as low as possible without distillation of significant quantities of the alcohol.

The second acceptable procedure involves the use of a hydrocarbon solvent to azeotrope the water of reaction from the mixture. Thus, a mixture of alcohol, catalyst, glucose, and a hydrocarbon such as hexane, heptane, toluene, benzene, octane, or the like, is refluxed with a Dean-Stark trap attached to the reaction flask so that the hydrocarbon is recycled, but the azeotroped water of reaction can be separated. An amount of hydrocarbon is used so that the mixture will reflux at the desired temperature. When the reaction is complete, the mixture is neutralized, and the product, if desired, is further purified by removal of some or all of the excess alcohol.

The rate of reaction is controlled by the reaction temperature and catalyst concentration, and should be maintained so that the water can be removed effectively faster than it can be formed. Higher temperatures and more catalyst cause the reaction to take place more rapidly. Temperatures in the range of about 80°C. to about 130°C. are generally effective. At lower temperatures, the reaction is unnecessarily slow, and at higher temperatures the risk of oligomerization, degradation, and charring of the sugar is increased. Also at the higher temperatures, the reaction may go faster than desired so that the efficiency of removal becomes less.

The preferred temperature range is about 90°C. to 110°C. The catalyst should be an acid, and generally, such acids as those described in the prior art ($H_2SO_4$, HCl, sulfonic ion exchange resins, $HNO_3$, etc.) are suitable. The amount of catalyst that should be used depends partly on the mol ratio of alcohol to glucose. Generally, the higher the mol ratio, the higher the amount of catalyst required. The temperature also has an effect on the amount of catalyst required. For example, a reaction might take approximately the same amount of time if the reaction temperature is increased about 10°C. and the catalyst concentration is decreased about 50 percent.

When, for example, sulfonic acid is used as the catalyst, it is acceptable to use from 0.05 g/mol glucose to about 15 g./mol glucose, or even more. With preferred reaction conditions, however, the optimum catalyst level is in the approximate range of 0.1 to 2.0 g./mol glucose (0.1 to 2.0 mol percent). An excess of catalyst can cause charring of the glucose. Illustrative of the practice of this invention are the following examples. It should be understood, of course, that they are merely exemplary and are not limiting.

EXAMPLE 1

Vacuum Dehydration Process Using 3.2 Mols n-Octanol/Mol Glucose

Into a 500 ml., three-neck flask equipped with stirrer, thermometer, and vacuum connection, is weighed 210.0 g. (1.62 m.) of n-octanol and 1.0 g. of concentrated sulfuric acid. Stirring is commenced and there is added 90.0 g. (0.50 m.) of glucose. The pressure is reduced to 40–45 mm. Hg., and the mixture is then heated to 95°C. in one-half hour. It is maintained at 95°–100°C./40 mm. Hg. for 3¾ hours while it becomes sparklingly clear. The collected distillate is comprised of a bottom aqueous layer of 9.7 g. and an upper alcohol layer of 22.5 g.

Vapor phase chromatographic analysis of the reaction mixture shows that it contains 20.7 percent octyl glucoside and practically no glucose. The mixture is neutralized with 1.6 g. of 50 percent sodium hydroxide solution, so that the pH of a 5 percent solution in 50 percent aqueous isopropanol is 11.3. The excess octanol is then removed by distillation to a pot temperature of 170°C. at 1 mm. Hg. The residue (product) weighs 120.7 g. It is cooled to 120°C. and then slowly diluted to 70 percent solids by the addition of 51.7 g. of water. The recovered octanol weighs 144.7 g. The final product is also analyzed by vapor phase chromatography of a trimethylsilyl derivative. Its indicated composition (based on solids) is 1.0 percent n-octanol, 52.0 percent octyl glucoside, and 47.0 percent octyl oligosaccharides.

EXAMPLE 2

Azeotropic Water Removal Using 1.5 Mols n-Hexanol/Mol Glucose

To a 500 ml., 3-neck flask equipped with stirrer, thermometer, and hexane-filled Dean-Stark trap with attached condenser, is charged 76.5 g. (0.75 m.) of n-hexyl alcohol, 7.5 g. of hexane, 1.0 g. of concentrated sulfuric acid and 90.0 g. (0.50 m.) of anhydrous glucose. The mixture is stirred and refluxed at 105–110°C. for 45 min. while 9.0 ml. of water is removed, and then it is neutralized with 2.0 g. of 50 percent sodium hydroxide solution. It contains 21.5 percent of hexyl glucoside, by vapor phase chromatographic analysis, and weighs 162.8 g. Hexanol is distilled from the mixture up to 170°C./2 mm. Hg. leaving a residue of 99.3 g., which contains essentially no hexanol and has a hexyl glucoside content of 30.9 percent. The distillate is comprised of 61.2 g. of hexanol and 2.3 g. of hexane. By calculation, then, the approximate composition of the product before removal of hexanol is:
- 38.1 percent hexanol
- 21.5 percent hexyl glucoside
- 40.4 percent hexyl oligosaccharides After hexanol removal, the composition is approximately:
- 0 – 5 percent hexanol
- 30.9 percent hexyl glucoside
- 64 – 69 percent hexyl oligosaccharides

EXAMPLE 3

Azeotropic Water Removal Using 6.3 Mols Butyl Carbitol/Mol Glucose

To equipment similar to that of Example 2 is charged 257 g (1.58) of butyl carbitol, 20 g. heptane, and 25 g. of a sulfonated styrene-divinylbenzene ion exchange resin. The mixture is refluxed for two hours to dry it completely as 2.6 ml. of water are removed. There is then added 45 g. (0.25 m.) of glucose and another 16 g. of heptane and the mixture is refluxed for about 10 hours while the water of reaction is removed. Vapor phase chromatographic analysis of a trimethylsilyl derivative (g.l.c.) shows that a large proportion of the product is the glucoside of butyl carbitol. The mixture is filtered to remove the resin, giving 271 g. of a solution of butyl carbityl glucoside and butyl carbityl oligosaccharides in butyl carbitol.

EXAMPLE 4

Azeotropic Water Removal Using 6 Mols of a Mixture of n-Octanol and n-Decanol/Mol Glucose A mixture of 441 g. (3.0 m.) of a mixture of approximately equal parts of n-octanol and n-decanol, 90 g. (0.5 m.) of glucose, 15 ml. of heptane, and 7.5 g. of concentrated sulfuric acid is stirred and refluxed under partial vacuum at 85–90°C., while about 10 ml. of water are collected in a Dean-Stark trap. G.l.c. analysis shows only a very small glucose content, and an appreciable quantity of octyl and decyl-α-and β-D-glucopyranosides. The product which consists of a mixture of n-octanol and n-decanol, octyl and decyl glucosides, and octyl and decyl oligosaccharides, is neutralized and bottled.

EXAMPLE 5

Azeotropic Water Removal and Vacuum Dehydration Using 1.1 Mols of a Mixture of Dodecyl, Tridecyl, Tetradecyl, and Pentadecyl Alcohols/Mol Glucose A mixture of 114 g. (0.55 m.) of a commercially available mixture of dodecyl, tridecyl, tetradecyl, and pentadecyl alcohols, about 50 g. of heptane, 25 g. of the resin catalyst of Example 3, and 15 g. (0.083 m.) of glucose is refluxed for three hours while about 1.5 ml. of water is removed. The pressure is then reduced to about 20 mm. Hg. to remove heptane and water of reaction. The mixture is stirred at about 85°–90°C./20 mm. Hg. for 19 hours, while another 75 g. of glucose is added in 15 g. portions, and water of reaction is stripped out. After another 4 hours, the mixture becomes too thick to stir. G.l.c. analysis shows that most of the glucose has reacted and there is present a large amount of the corresponding glucosides of the starting alcohols.

EXAMPLE 6

Vacuum Dehydration Using 2.5 Mols of a Mixture of n-Octanol and n-Decanol/Mol Glucose To a 2-liter, three-neck flask equipped with stirrer and thermometer is charged 732.5 g. (5.0 m.) of a commercially available mixture comprised of 44 parts of n-octanol and 55 parts of n-decanol. Stirring is started and 4.0 g. of 98 percent sulfuric acid is added dropwise. There is then added 360.0 g. (2.0 m.) of anhydrous glucose. Vacuum is applied and the pressure is reduced to 40 mm. Hg. The mixture is heated to 95°C. during 4 hours. Water, 37.1 g.; and alcohol, 11.0 g.; are collected in a trap during 4¼ hours, while the mixture becomes clear and free of suspended glucose, and during another hour while stirring of the mixture at 95°–100°C./40 mm. Hg. is continued. G.l.c. analysis of the mixture shows 19.4 percent of octyl and decyl glucosides at the time the mixture is clear, 20.2 percent a half hour later, and 18.7 percent at the end of another half hour. Vacuum is released and the mixture is cooled to 50°C.

There is added 6.4 g. of 50 percent aqueous sodium hydroxide solution. A 5 percent solution of the product in 50 percent aqueous isopropanol has a pH of 11.5. The material in the flask (1051.0 g.) is then heated to 95°–100°C., and stirred at that temperature and 40 mm. Hg. pressure for 1 hour while 9.5 g. of water, and other low-boiling compounds, are removed. The pressure is then gradually reduced to 1 mm. Hg., while the temperature is raised to 170°C., and 577.3 g. of unreacted alcohols are distilled from the mixture. The residue (461.3 g.) is cooled to 135°C. The vacuum line is replaced by a condenser, and 197.7 g. of water is added through the top of the condenser, while the temperature rapidly drops below 100°C. The pH of the 70 percent solids solution of the product is 5.8. G.l.c. analysis of the product indicates that it contains, on a solids basis,
- 1 percent n-decanol
- 44.6 percent octyl and decyl glucosides
- 54.4 percent octyl and decyl oligosaccharides

EXAMPLE 7
Vacuum Dehydration Process Using 1.25 Mols of a Mixture of n-Octanol and n-Decanol/Mol of Glucose and Extraction of Excess Alcohol as a Purification Technique To a 1-liter, three-neck flask fitted with thermometer, stirrer, and vacuum take-off adapter is charged 367.5 g. (2.5 m.) of a commercially available mixture comprised of approximately 45 percent n-octanol and 55 percent n-decanol, and 1.0 g. of concentrated sulfuric acid. Stirring is commenced and 360.0 g. (2.0 m.) of anhydrous glucose is added. The pressure is reduced to 40 mm. Hg. and the mixture is heated to 95°C. in one-third hour, stirred at 95°-100°C./40 mm. Hg. for about 6½ hours, while the glucose goes into solution and water is removed, and then neutralized with 0.8 g. of 50 percent aqueous sodium hydroxide solution so that the pH of a 5 percent solution in 50 percent isopropanol is 5.2. G.l.c. analysis of the mixture indicates that it contains about 17 percent of octyl and decyl glucosides and only a small quantity of unreacted glucose.

A 100 g. portion of the product is transferred to a 500 ml. three-neck flask with a stopcock in the bottom. There is added 125 g. of heptane and 30 g. of water, and the mixture is stirred and heated to reflux at 79°C. Stirring is discontinued and the mixture separates in 5 minutes into two layers. The top layer (36.6 g.) is stripped free of solvents to 9.2 g. of unreacted alcohol. Another 75 g. of heptane is added to the bottom layer, and the mixture is stirred and reheated to reflux. Stirring is discontinued and the two layers which form almost immediately are separated. The top layer (145.3 g.) is stripped free of solvents to a residue of 19.8 g. of unreacted alcohol. The bottom layer is extracted two more times with 75 g. portions of heptane. The upper layers weigh 106.6 g. and 87.6 g., respectively, and contain 8.0 g. and 3.3 g. of unreacted alcohol, respectively. From the bottom layer of 96.7 g. is distilled 20.5 g. of a mixture of heptane and water. The residue of 76.2 g. is calculated to contain 78.4 percent solids. There is added 9.3 g. of water to decrease the solids content to 70 percent. The pH is 4.3 and the color on the Varnish Color Scale is 6–. There is added 0.4 g. of sodium perborate monohydrate and the mixture is stirred at 50°C. for 4 hours while the color drops to 2+ and the pH rises to 6.1. The product is analyzed by g.l.c. and its composition, on a solids basis, is calculated to be as follows:

```
% n-octanol = 0.8
% n-decanol = 1.0
% octyl and decyl glucosides = 28.8
% unreacted glucose = approx. 10
% octyl and decyl oligosaccharides = approx. 60
```

EXAMPLE 8
Alkanol-Alkyl Glucoside-Alkyl Oligosaccharide Mixtures Prepared Directly From Alcohols and Glucose Using the Vacuum Dehydration Procedure The following table summarizes some of the preparations of the alkanol-alkyl glucoside-alkyl oligosaccharide mixtures which were carried out using the general procedure described in Example 6:

Table 1

| Experiment No. | Alcohol | Mols Alcohol/ Mol Glucose | Composition of Product | | |
|---|---|---|---|---|---|
| | | | % Alcohol | % Alkyl Glucoside | % Alkyl Oligosaccharide |
| A | n-Hexanol | 1.0 | nil | 23.0 | 77.0 |
| B | n-Hexanol | 2.0 | nil | 42.2 | 57.8 |
| C | n-Hexanol | 3.0 | nil | 54.0 | 46.0 |
| D | n-Octanol | 1.25 | 44.3 | 17.9 | 37.8 |
| E | n-Octanol | 1.6 | nil | 33.3 | 66.7 |
| F | 45/55 Mixture of n-octanol and n-Decanol | 1.25 | nil | 28.2 | 71.8 |
| G | 45/55 Mixture of n-Octanol and n-Decanol | 2.5 | 3.6 | 42.2 | 54.2 |
| H | 45/55 Mixture of n-Octanol and n-Decanol | 3.0 | 1.1 | 47.2 | 51.7 |
| I | n-Decanol | 1.5 | nil | 28.9 | 71.1 |
| J | n-Dodecanol | 1.75 | 3.6 | 35.1 | 61.3 |
| K | n-Dodecanol | 2.0 | 9.3 | 29.8 | 60.9 |
| L | n-Dodecanol | 3.0 | 6.0 | 34.0 | 60.0 |
| | 55/45 Mixture of n-Dodecanol and n-Tetradecanol | 2.0 | 3.2 | 35.2 | 61.6 |
| M | 55/45 Mixture of n-Dodecanol and n-Tetradecanol | 3.0 | 4.3 | 41.0 | 54.7 |
| N | Mixture of Dodecanol and Tridecanol | 1.5 | — | — | — |
| O | n-Tetradecanol | 2.0 | 2.5 | 34.1 | 63.4 |
| P | n-Tetradecanol | 3.0 | 1.7 | 38.0 | 60.3 |
| Q | n-Hexadecanol | 3.0 | — | — | — |
| R | n-Hexadecanol | 4.0 | 9.4 | 49.6 | 41.0 |
| S | n-Octadecanol | 4.0 | 24.8 | 25.8 | 49.4 |
| T | n-Octadecanol | 6.0 | 27.2 | 25.4 | 47.4 |

What is claimed is:

1. In a process for the preparation of a mixture comprised of high molecular weight alkyl glucosides, high molecular weight alkyl oligosaccharides, and a starting higher alcohol, the improvement consists essentially of:

a. reacting a monosaccharide selected from the group consisting of glycose and a source of glycose with a high molecular weight monohydric straight or branched primary alcohol having from 6 to 18 carbon atoms in the presence of an acid catalyst wherein said catalyst is sulfuric acid, hydrochloric acid, sulfonic ion exchange resins, or nitric acid, at elevated temperatures ranging from about 80°C to about 130°C;

b. removing from the reaction mixture the water of reaction substantially as fast as it is formed by either vacuum distillation or azeotropic distillation;

c. controlling the catalyst concentration and temperature so that solubilization of said monosaccharide and formation of the desired products occur, while oligomerization and degradation of said monosaccharides is substantially avoided; and d. employing a molar ratio of said alcohol to said monosaccharide such that decreasing glycose solubility with rising alcohol molecular weight is compensated for by increasing said molar ratio.

2. The process as set forth in claim 1 wherein said monosaccharide is glucose.

3. The process as set forth in claim 1 wherein said alcohol ranges from eight to fourteen carbon atoms.

4. The process as set forth in claim 1 wherein said molar ratio of alcohol to monosaccharide ranges from 1:1 up to 6:1, provided sufficient solubility of the reaction mixture remains.

5. The process as set forth in claim 1 wherein the concentration of said acid catalyst ranges from about 0.03 percent to about 10 percent by weight, based on the aldose charge to the reaction vessel.

6. The process as set forth in claim 1 wherein there is further provision for removing substantially all of said alcohol remaining unreacted after the reaction goes to completion, whereby said product is substantially free of said alcohol starting material.

* * * * *